United States Patent

[11] 3,559,565

| [72] | Inventor | Clarence A. Getz<br>Hot Springs, Mont. (P.O. Box 316<br>Davenport, Wash. 99122) |
|---|---|---|
| [21] | Appl. No. | 810,879 |
| [22] | Filed | Dec. 24, 1968 |
| [45] | Patented | Feb. 2, 1971<br>Substitute for application Ser. No. 341,944,<br>Feb. 3, 1964, abandoned. |

[54] BARBECUE GRILL
11 Claims, 12 Drawing Figs.

[52] U.S. Cl. ................................................. 99/340,
99/450, 99/397
[50] Field of Search ........................................... 99/340,
339, 376, 380, 391, 393, 395, 397—98, 402,
409—10, 421, 443, 448, 450; 126/9, 11, 25,
29—30

[56] References Cited
UNITED STATES PATENTS

| 769,745 | 9/1904 | Hendrickson ................ | 99/397 |
| 1,034,581 | 8/1912 | Burky .......................... | 99/380X |
| 1,490,177 | 4/1924 | Matson ........................ | 99/376 |
| 2,846,941 | 8/1958 | Goodwin ...................... | 99/340 |
| 3,369,482 | 2/1968 | Kahn et al. ................... | 99/450 |

Primary Examiner—Walter A. Scheel
Assistant Examiner—Arthur O. Henderson
Attorney—Clarence A. O'Brien and Harvey B. Jacobson ABSTRACT: A fuel receptacle rotatably mounts a frame about a vertical axis which in turn removably supports a food holding grill assembly or rotisserie through which food may be controllably exposed to heat and smoke evolved from the receptacle. The grill assembly may be angularly displaced to a withdrawn position and to invert the food when positioned over the receptacle. The rotisserie rotates the food over the receptacle below a hood that may be mounted on the rotisserie frame.

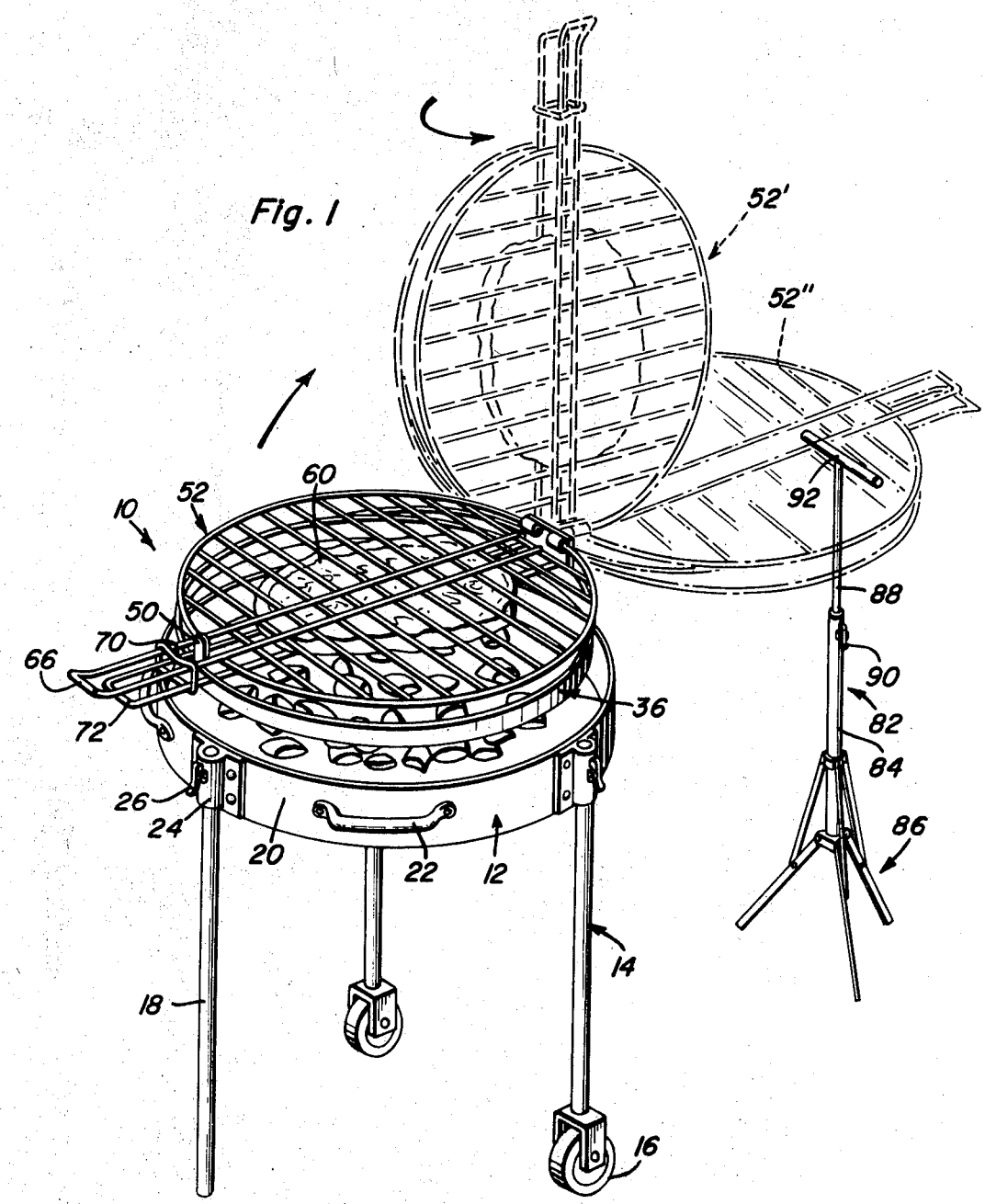
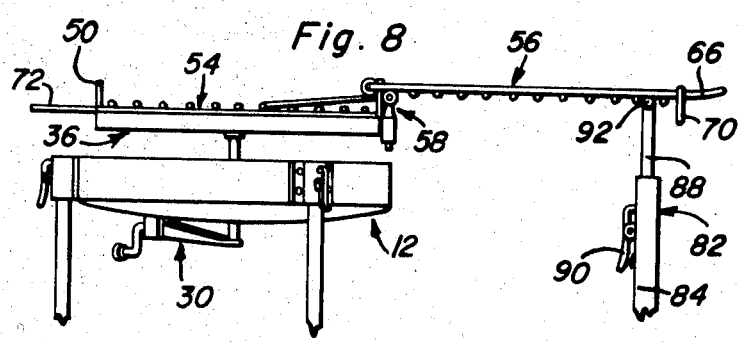
Fig. 1
Fig. 8
Clarence A. Getz
INVENTOR.

PATENTED FEB 2 1971
3,559,565
SHEET 2 OF 3
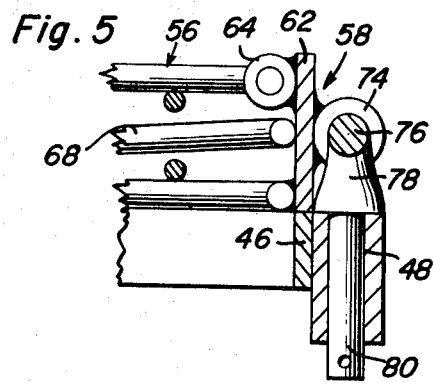
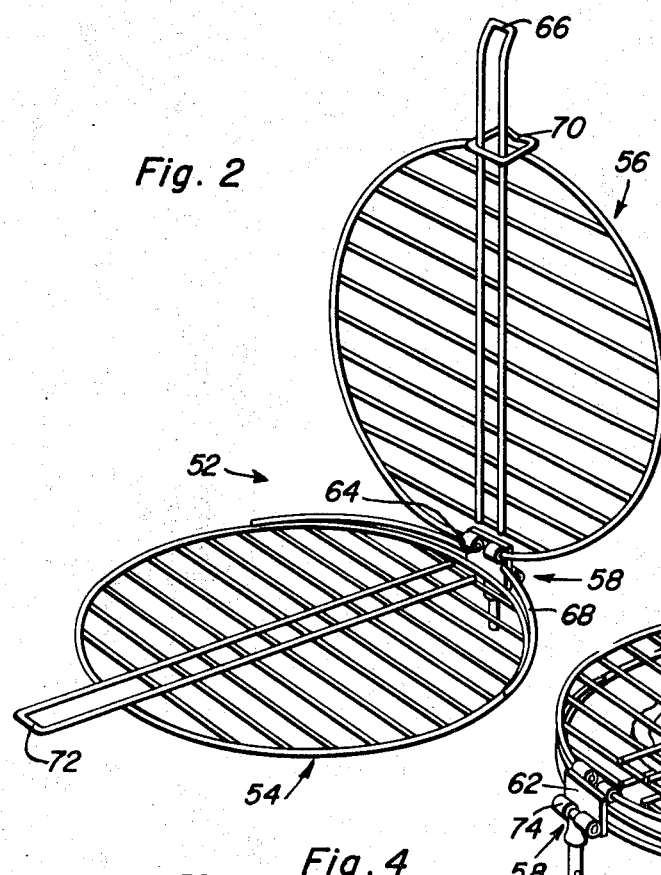
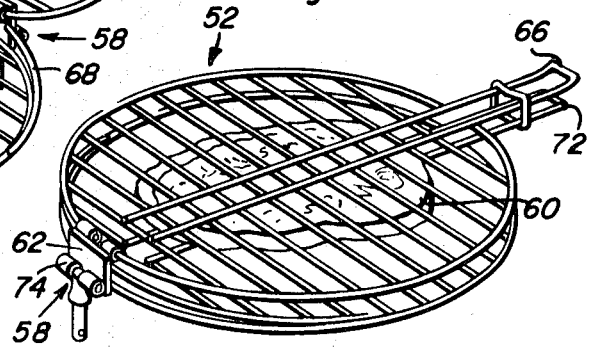
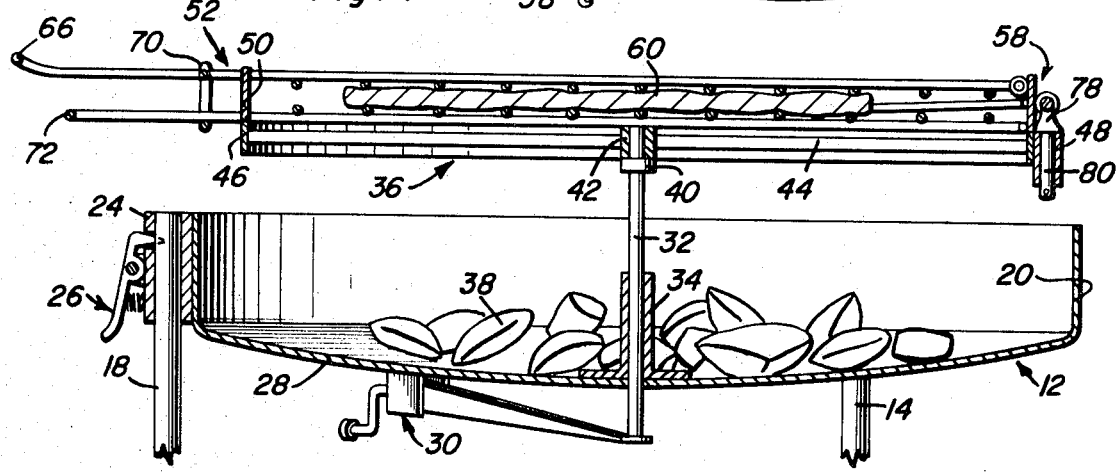
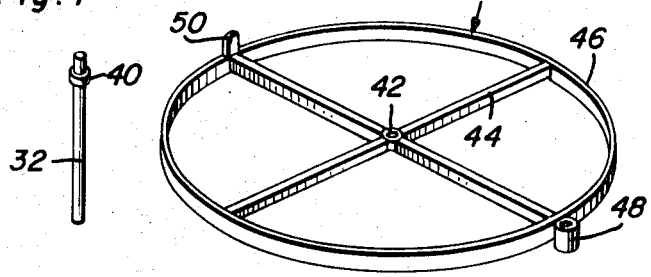
Clarence A. Getz
INVENTOR.
BY *Clarence A. O'Brien*
*and Harvey B. Jacobson*
Attorneys

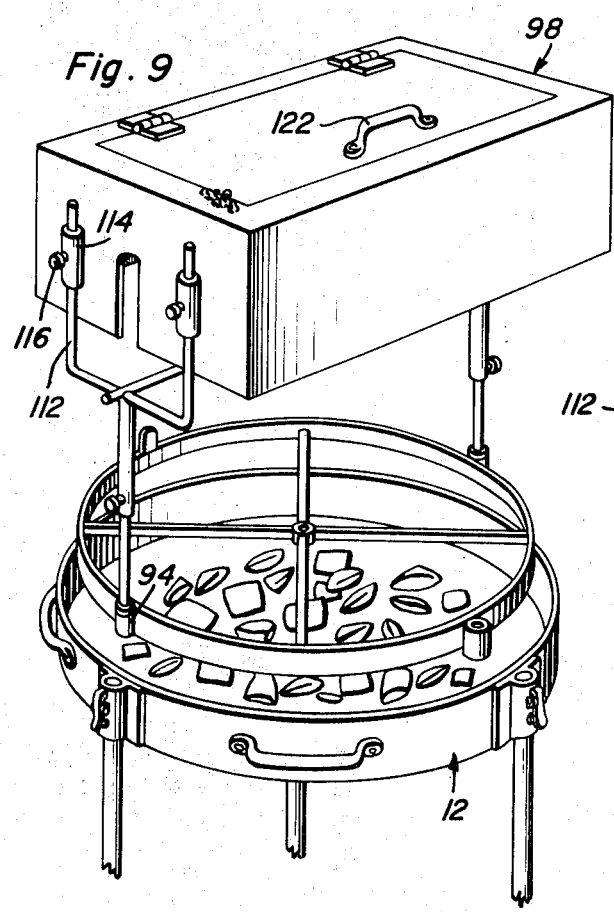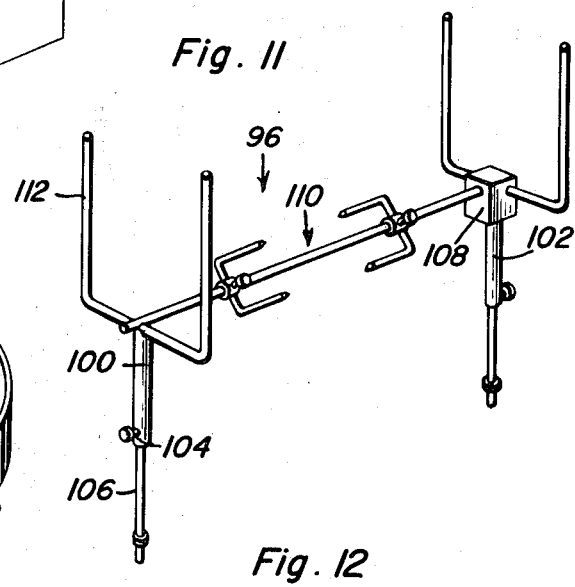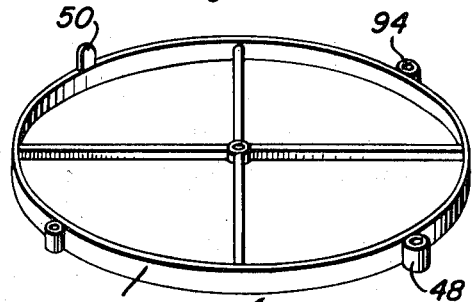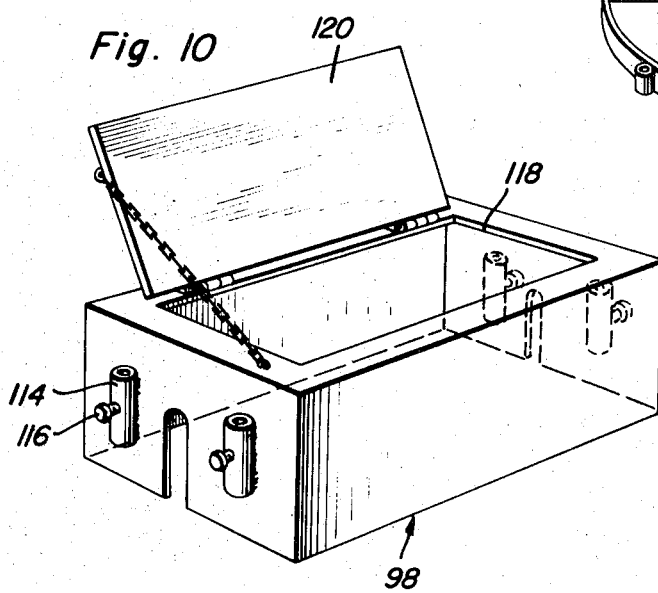

BARBECUE GRILL

This invention relates to improvements in an outdoor type of charcoal grilling apparatus as disclosed and claimed in my prior application Ser. No. 341,944, filed Feb. 3, 1964 and abandoned prior to the filing of the present application.

A primary object of the present invention is to provide a food grilling or barbecuing assembly wherein the handling of the food and loading of the fuel receptacle, fire basin or brazier, is facilitated.

In accordance with the present invention a rotatable frame mounts a food supporting grill assembly as well as other food supporting facilities such as a rotisserie and hood. The food supporting grill assembly firmly holds the food in close spaced relation above a fuel receptacle for heating and may be readily reversed for exposure of both sides of the food to the heat without use of utensils. Also, the food supporting grill assembly may be displaced to a withdrawal position and supported in such position to either prevent further cooking of the food or to permit loading of the fuel receptacle with additional fuel or items of food to be intermingled with the fuel, wherein the fuel is in the form of charcoal briquettes, for example.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of one form of the invention involving a novel grill assembly.

FIG. 2 is a perspective view of the grill assembly in an open condition.

FIG. 3 is a perspective view of the grill assembly in a closed condition.

FIG. 4 is a side sectional view showing the closed grill assembly installed.

FIG. 5 is an enlarged sectional view of the hinge portion of the grill assembly.

FIG. 6 is a perspective view of the supporting frame associated with the grill assembly.

FIG. 7 is a perspective view of the vertically adjustable support for the frame.

FIG. 8 is a partial side elevational view of the complete apparatus.

FIG. 9 is a perspective view of another form of the invention involving a rotisserie assembly.

FIG. 10 is a perspective view of the hood associated with the rotisserie assembly.

FIG. 11 is a perspective view of the rotisserie support.

FIG. 12 is a perspective view of the mounting frame associated with the rotisserie assembly.

Referring now to the drawings in detail, and to FIGS. 1 through 8 initially, it will be observed that the complete apparatus of the present invention generally referred to by reference numeral 10 includes a fuel receptacle 12 of conventional construction supported by a pair of leg assemblies 14 having wheels 16 for transport purposes and a third anchor support leg 18. The annular sidewall 20 of the fuel receptacle 12 may be provided with handles 22 to facilitate movement thereof. Spaced leg receiving brackets 24 are mounted on the wall 20, said brackets being provided with releasable latch devices 26 as more clearly illustrated in FIG. 4 so as to releasably lock the legs received within the brackets for support of the fuel receptacle above the ground. Also mounted on the dished bottom 28 of the fuel receptacle is a manually operable adjusting device 30 engageable with the lower end of the spindle 32 for vertical adjustment thereof. The spindle therefore extends through a centrally mounted tubular member 34 secured to the bottom 28 of the fuel receptacle so that the spindle 32 may rotatably support a frame member 36 (FIG. 6) in vertically adjusted spaced relation above the fuel or charcoal briquettes 38 in the fuel receptacle. The spindle is therefore provided with a collar 40 (FIG. 7) on which the hub 42 of the frame rests. The hub 42 is therefore connected by a plurality of radial spokes 44 to the annular rim portion 46 of the frame thereby defining access openings through which the fuel receptacle may be loaded without removal of the frame 36 from the spindle 32. Mounted on the annular rim portion 46 of the frame, at diametrically opposite locations, are a pivot collar 48 and an upstanding lock tab 50. The frame 36 is thereby adapted to removably support a grill assembly generally referred to by reference numeral 52.

The grill assembly, as more clearly seen in FIGS. 2, 3 and 5, includes a pair of generally circular grill plates 54 and 56 made of rod-shaped elements spaced apart so as to both support food thereon and yet permit the food to be exposed to the heat evolved from the ignited fuel 38 within the fuel receptacle. The grill plates 54 and 56 are hingedly interconnected to a hinge assembly 58 about closely spaced parallel axes so that food such as the steak 60 may be received between the grill plates and held clamped therebetween as shown in FIGS. 3 and 4. The hinge assembly 58 includes a hinge plate member 62 to which hinge projections 64 are welded on one side in order to hingedly connect the grill plate 56 to the hinge plate. Also rigidly welded to the hinge plate 62 spaced from the hinge axis extending through the hinge projection 64, is the other grill plate 54 which may be provided with connecting rod parts 68 for more rigidly securing the grill plate 54 to the hinge plate 62. It will therefore be apparent, that the grill plate 56 is pivotally displaceable between the positions respectively illustrated in FIGS. 2 and 3 relative to the grill plate 54. When in the closed position illustrated in FIG. 3, clamping the food 60 therebetween, the grill plates may be locked together by a keeper element 70 which is loosely retained on the handle portion 66 of the grill plate 56 for embracing the projecting handle portion 72 which extends from the grill plate 54. The hingedly interconnected grill plates with the food clamped therebetween may then be brought to the fuel receptacle and removably mounted on the frame 36 about a movable axis, the frame being in turn rotatably mounted about a fixed axis extending through the spindle 32 and the tubular portion 34 of the fuel receptacle. Toward this end, hinge projections 74 are welded to the hinge plate 62 on the side opposite the hinge projections 64 so as to receive the hinge pin 76. The hinge pin is in turn rigidly connected to a hinge mounting member 78 which rests on top of the pivot collar 48 for angular displacement about an axis extending about the shaft portion 80 which is inserted in the collar 48.

When the grill assembly in its closed condition is rotatably mounted above the fuel receptacle by means of the frame 36, it will be locked against pivotal displacement about the movable axis extending through the shaft portion 80 because the lock tab 50 will then project between the handle portions 72 and 66 associated with the grill plates as more clearly seen in FIGS. 1 and 4. In this position of the grill assembly, the food 60 will be exposed on the lower side thereof to the heat evolved from the fuel briquettes 38. Should it be desired to reverse the side of the food 60 exposed to the heat, the grill assembly need only be pivotally displaced upwardly about an axis extending through the hinge pin 76 to the position shown by dotted lines in FIG. 1 and generally referred to by reference numeral 52'. In this position, the grill assembly will be free of the lock tab 50 projecting from the frame 36 so that it may be pivotally displaced about the movable axis extending through the shaft portion 80. After pivotal displacement about the shaft portion 80 by 180°, the grill assembly may then be pivoted downwardly about the hinge pin 76 to the heat exposing position with the other side of the food 60 then exposed to the heat. On the other hand, should it be desired to hold the food withdrawn from exposure to the heat, the grill assembly may be pivotally displaced about the hinge pin 76 from the heat exposing position to the position illustrated in FIG. 1 by dotted line and generally referred to by reference numeral 52''. The grill assembly may be supported in this withdrawal position by an adjustable ground support assembly generally referred to by reference numeral 82 having a tubular portion 84 to which a foldable leg assembly 86 is connected and from which the adjustable rod 88 extends held in any extensible position by the releasable lock device 90. A transverse support rod 92 may therefore be connected to the upper end of the extensible rod 88 on which the grill assembly rests. The entire grill assembly may be supported by the ground support 82 as illustrated in FIG. 1 or only the grill plate 56 thereof as illustrated in FIG. 8. When food is either being replaced or removed from the grill assembly.

Referring now to FIGS. 9 through 12, it will be observed that the frame 36' is identical in construction to the frame 36 except that it is further provided with a pair of supporting collars 94 welded to the outer rim 46 at diametrically opposite locations and spaced from the pivotal support collar 48. The frame 36' may therefore support thereabove in place of the grill assembly 52, a rotisserie assembly which includes the rotisserie support generally referred to by reference numeral 96 and the hood generally referred to by reference numeral 98. As more clearly seen in FIG. 11, the rotisserie support 96 includes support brackets 100 and 102 having extensible rods 104 with collar portions 106 adapted to be received within the support collars 94 and resting thereon so that the rotisserie support may be rotatable with the frame 36'. The support bracket 102 may therefore be clamped to a rotisserie drive motor 108 connected to one end of the rotatable spit 110, the other end of which rests on a bearing portion of the bracket 100. Both brackets 100 and 102 are also provided with spaced upwardly extending rod portions 112 adapted to be received within and locked to collar portions 114 by setscrews 116, said collar portions being welded to opposite longitudinal ends of the hood 98. The hood may also be provided with an access opening 118 shown in FIG. 10 through which rotating food may be basted. The opening is therefore closed by a closure or door 120 hingedly connected to the top of the hood and provided with a handle 122 as shown in FIG. 9.

From the foregoing description, the construction and utility of the grill and barbecue apparatus will be apparent. It will therefore be appreciated, that the apparatus of the present invention facilitates the handling and cooking of foods inasmuch as the food supporting assembly may be loaded with the food prior to its mounting on the rotatable frame and easily removed or displaced out of alignment with the fuel receptacle to stop the cooking of the food and/or to load the fuel receptacle with either additional fuel or with items of food that are to be intermingled with the charcoal briquettes, through the access opening in the rotatable frame. Grilling of food on a grill assembly or barbecuing of the food in a rotisserie assembly may thereby be achieved in a facilitated manner. The grill assembly furthermore has the advantage of enabling reversal of the food for exposure of both sides thereof to the heat without use of utensils or shifting of the food on the grill plates.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. In combination with a fuel receptacle, a food supporting assembly and means for mounting said food supporting assembly in spaced relation —n above the fuel in said receptacle, said food supporting assembly comprising, frame means adapted to be rotatably mounted on a fixed axis through the receptacle in adjustable spaced adjacency above the fuel and having access openings through which the receptacle may be loaded, hinge means removably mounted by the frame means for displacement about a movable axis spaced from said fixed axis, and grill means pivotally connected to said frame means by the hinge means for displacement between a heat exposing position aligned with the receptacle above the frame means and a withdrawal position out of alignment with the receptacle exposing the access openings in the frame means.

2. The combination of claim 1 wherein said grill means comprises, a pair of grill plates hingedly connected to the hinge means about closely spaced parallel axes for holding food therebetween, and handle means connected to said grill plates for displacement of the grill plates between said heat exposing and withdrawal positions to either permit loading of the receptacle, reverse exposure of food held between the grill plates to heat evolved from the fuel in the receptacle or withdraw food from exposure to said heat.

3. The combination of claim 2 including means for locking the grill means against pivotal displacement relative to the frame means about said movable axis when the grill means is in said heat exposing position.

4. The combination of claim 3 including ground support means engageable with the grill means in said withdrawal position for support of the grill means in spaced relation to the frame means.

5. The combination of claim 1 including means for locking the grill means against pivotal displacement relative to the frame means about said movable axis when the grill means is in said heat exposing position 6. The combination of claim 1 including ground support means engageable with the grill means in said withdrawal position for support of the grill means in spaced relation to the frame means.

7. In combination with a fuel receptacle, a food supporting assembly and means for mounting said food supporting assembly in spaced relation above the fuel in said receptacle, said food supporting assembly comprising a frame, means rotatably mounting the frame about a fixed vertical axis through the receptacle, said frame having access openings, and food support means removably mounted on the frame for displacement about an axis substantially perpendicular to said fixed axis adapted to expose food to heat evolved from the receptacle.

8. The combination of claim 7 including food means mounted by the food support means for displacement with the food support means in spaced relation above the frame means.

9. In combination with a fuel receptacle, a food supporting assembly and means for mounting said food supporting assembly in spaced relation above the fuel in said receptacle, said food supporting assembly comprising, a frame, means mounting the frame above the receptacle for rotation about a fixed vertical axis extending centrally through the receptacle, said frame having access openings through which the receptacle may be loaded, food holding means removably mounted by the frame in a selectively adjusted position relative thereto, said food holding means including hinged means for exposing food supported thereon.

10. The combination of claim 9 wherein said food holding means includes a grill plate, means connected to said grill plate for pivotal mounting thereof on the frame means about two perpendicular intersecting axes spaced from said fixed axis, said hinged means being hingedly connected to the grill plate about an axis parallel to one of said two perpendicular axes for clamping food thereto.

11. The combination of claim 9 wherein said food holding means includes, a rotisserie support removably mounted on the frame means, and a hood member carried by said rotisserie support, said hinged means comprising a closure hinged to said hood member for closing an access opening therein.